US007738837B2

(12) United States Patent
Karabinis

(10) Patent No.: US 7,738,837 B2
(45) Date of Patent: Jun. 15, 2010

(54) SATELLITES USING INTER-SATELLITE LINKS TO CREATE INDIRECT FEEDER LINK PATHS

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 1210 days.

(21) Appl. No.: 11/313,572

(22) Filed: Dec. 21, 2005

(65) Prior Publication Data

US 2006/0189275 A1 Aug. 24, 2006

Related U.S. Application Data

(60) Provisional application No. 60/655,148, filed on Feb. 22, 2005.

(51) Int. Cl.
H04B 7/185 (2006.01)
(52) U.S. Cl. .................... 455/12.1; 455/427; 455/445; 455/430; 455/11.1; 370/316; 370/351; 342/357.15; 342/357.16
(58) Field of Classification Search ......... 455/427–429, 455/445, 446, 436, 12.1, 13.1–13.3, 3.01–3.03, 455/25, 430; 370/316, 323–325, 422, 351, 370/322, 326, 320; 342/352, 357.1, 357.15, 342/357.16, 353–356
See application file for complete search history.

(56) References Cited

U.S. PATENT DOCUMENTS 5,612,703 A 3/1997 Mallinckrodt
5,619,525 A 4/1997 Wiedeman et al.

(Continued)

FOREIGN PATENT DOCUMENTS

DE 44 41 356 6/1995

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.
Ayyagari et al., "A satellite-augmented cellular network concept", *Wireless Networks*, Vo. 4, 1998, pp. 189-198.

(Continued)

*Primary Examiner*—Sujatha Sharma
(74) *Attorney, Agent, or Firm*—Myers Bigel Sibley & Sajovec, P.A.

(57) ABSTRACT

Methods of providing a feeder link between a first substantially geo-stationary satellite and a satellite gateway include establishing a communications link between the satellite gateway and a second substantially geo-stationary satellite, establishing an inter-satellite communications link between the first substantially geo-stationary satellite and the second substantially geo-stationary satellite, and communicating between the first substantially geo-stationary satellite and the satellite gateway via the inter-satellite communications link and the communications link. A satellite communications system includes first and second substantially geo-stationary satellites configured to establish an inter-satellite communications link therebetween, and a satellite gateway configured to establish a direct feeder link with one of the first and second substantially geo-stationary satellites and to establish an indirect feeder link with the other of the first and second substantially geo-stationary satellites using the inter-satellite communications link and the direct feeder link.

10 Claims, 5 Drawing Sheets

U.S. PATENT DOCUMENTS

| | | | |
|---|---|---|---|
| 5,631,898 | A | 5/1997 | Dent |
| 5,761,605 | A | 6/1998 | Tawil et al. |
| 5,765,098 | A | 6/1998 | Bella |
| 5,812,947 | A | 9/1998 | Dent |
| 5,825,325 | A * | 10/1998 | O'Donovan et al. ......... 342/353 |
| 5,832,379 | A | 11/1998 | Mallinckrodt |
| 5,835,857 | A | 11/1998 | Otten |
| 5,848,060 | A | 12/1998 | Dent |
| 5,852,721 | A | 12/1998 | Dillon et al. |
| 5,878,329 | A | 3/1999 | Mallinckrodt |
| 5,884,142 | A | 3/1999 | Wiedeman et al. |
| 5,887,257 | A * | 3/1999 | Olds ........................... 455/427 |
| 5,907,541 | A | 5/1999 | Fairholm et al. |
| 5,924,014 | A | 7/1999 | Vanden Heuvel et al. |
| 5,926,758 | A | 7/1999 | Grybos et al. |
| 5,937,332 | A | 8/1999 | Karabinis |
| 5,940,753 | A | 8/1999 | Mallinckrodt |
| 5,991,345 | A | 11/1999 | Ramasastry |
| 5,995,832 | A | 11/1999 | Mallinckrodt |
| 6,011,951 | A | 1/2000 | King et al. |
| 6,023,605 | A | 2/2000 | Sasaki et al. |
| 6,029,935 | A | 2/2000 | Saunders |
| 6,047,161 | A * | 4/2000 | Sowles et al. .............. 455/12.1 |
| 6,052,560 | A | 4/2000 | Karabinis |
| 6,052,586 | A | 4/2000 | Karabinis |
| 6,067,442 | A * | 5/2000 | Wiedeman et al. ......... 455/13.1 |
| 6,072,430 | A | 6/2000 | Wyrwas et al. |
| 6,078,810 | A | 6/2000 | Olds et al. |
| 6,085,094 | A | 7/2000 | Vasudevan et al. |
| 6,091,933 | A | 7/2000 | Sherman et al. |
| 6,097,752 | A | 8/2000 | Wiedeman et al. |
| 6,101,385 | A | 8/2000 | Monte et al. |
| 6,108,561 | A | 8/2000 | Mallinckrodt |
| 6,134,437 | A | 10/2000 | Karabinis et al. |
| 6,157,811 | A | 12/2000 | Dent |
| 6,157,834 | A | 12/2000 | Helm et al. |
| 6,160,994 | A | 12/2000 | Wiedeman |
| 6,169,878 | B1 | 1/2001 | Tawil et al. |
| 6,198,730 | B1 | 3/2001 | Hogberg et al. |
| 6,198,921 | B1 | 3/2001 | Youssefzadeh et al. |
| 6,201,967 | B1 | 3/2001 | Goerke |
| 6,233,463 | B1 | 5/2001 | Wiedeman et al. |
| 6,240,124 | B1 | 5/2001 | Wiedeman et al. |
| 6,253,080 | B1 | 6/2001 | Wiedeman et al. |
| 6,256,497 | B1 | 7/2001 | Chambers |
| 6,324,405 | B1 | 11/2001 | Young et al. |
| 6,339,707 | B1 | 1/2002 | Wainfan et al. |
| 6,418,147 | B1 | 7/2002 | Wiedeman |
| 6,449,461 | B1 | 9/2002 | Otten |
| 6,522,865 | B1 | 2/2003 | Otten |
| 6,553,208 | B1 | 4/2003 | Worger et al. |
| 6,553,226 | B1 * | 4/2003 | Watson ........................ 455/428 |
| 6,609,002 | B1 * | 8/2003 | Krishnamurthy et al. .... 455/428 |
| 6,628,919 | B1 | 9/2003 | Curello et al. |
| 6,633,745 | B1 * | 10/2003 | Bethscheider .............. 455/12.1 |
| 6,684,057 | B2 | 1/2004 | Karabinis |
| 6,735,437 | B2 | 5/2004 | Mayfield et al. |
| 6,775,251 | B1 | 8/2004 | Wiedeman et al. |
| 6,785,543 | B2 | 8/2004 | Karabinis |
| 6,823,170 | B1 | 11/2004 | Dent |
| 6,847,817 | B2 | 1/2005 | Hadinger et al. |
| 6,856,787 | B2 | 2/2005 | Karabinis |
| 6,859,652 | B2 | 2/2005 | Karabinis et al. |
| 6,879,829 | B2 | 4/2005 | Dutta et al. |
| 6,892,068 | B2 | 5/2005 | Karabinis et al. |
| 6,898,428 | B2 | 5/2005 | Thorburn et al. |
| 6,937,857 | B2 | 8/2005 | Karabinis |
| 6,975,837 | B1 | 12/2005 | Santoru |
| 6,999,720 | B2 | 2/2006 | Karabinis |
| 7,006,789 | B2 | 2/2006 | Karabinis et al. |
| 2003/0068978 | A1 | 4/2003 | Karabinis et al. |
| 2003/0073436 | A1 | 4/2003 | Karabinis et al. |
| 2003/0149986 | A1 | 8/2003 | Mayfield et al. |
| 2003/0153308 | A1 | 8/2003 | Karabinis |
| 2004/0072539 | A1 | 4/2004 | Monte et al. |
| 2004/0121727 | A1 | 6/2004 | Karabinis |
| 2004/0142660 | A1 | 7/2004 | Churan |
| 2004/0157554 | A1 | 8/2004 | Wesel |
| 2004/0192200 | A1 | 9/2004 | Karabinis |
| 2004/0192293 | A1 | 9/2004 | Karabinis |
| 2004/0192395 | A1 | 9/2004 | Karabinis |
| 2004/0203393 | A1 | 10/2004 | Chen |
| 2004/0203742 | A1 | 10/2004 | Karabinis |
| 2004/0240525 | A1 | 12/2004 | Karabinis et al. |
| 2005/0026606 | A1 | 2/2005 | Karabinis |
| 2005/0037749 | A1 | 2/2005 | Karabinis et al. |
| 2005/0041619 | A1 | 2/2005 | Karabinis et al. |
| 2005/0064813 | A1 | 3/2005 | Karabinis |
| 2005/0079816 | A1 | 4/2005 | Karabinis et al. |
| 2005/0090256 | A1 | 4/2005 | Dutta |
| 2005/0118948 | A1 | 6/2005 | Karabinis et al. |
| 2005/0136836 | A1 | 6/2005 | Karabinis et al. |
| 2005/0164700 | A1 | 7/2005 | Karabinis |
| 2005/0164701 | A1 | 7/2005 | Karabinis et al. |
| 2005/0170834 | A1 | 8/2005 | Dutta et al. |
| 2005/0181786 | A1 | 8/2005 | Karabinis et al. |
| 2005/0201449 | A1 | 9/2005 | Churan |
| 2005/0208890 | A1 | 9/2005 | Karabinis |
| 2005/0221757 | A1 | 10/2005 | Karabinis |
| 2005/0227618 | A1 | 10/2005 | Karabinis et al. |
| 2005/0239399 | A1 | 10/2005 | Karabinis |
| 2005/0239403 | A1 | 10/2005 | Karabinis |
| 2005/0239404 | A1 | 10/2005 | Karabinis |
| 2005/0239457 | A1 | 10/2005 | Levin et al. |
| 2005/0245192 | A1 | 11/2005 | Karabinis |
| 2005/0260947 | A1 | 11/2005 | Karabinis et al. |
| 2005/0260984 | A1 | 11/2005 | Karabinis |
| 2005/0265273 | A1 | 12/2005 | Karabinis et al. |
| 2005/0272369 | A1 | 12/2005 | Karabinis et al. |
| 2005/0282542 | A1 | 12/2005 | Karabinis |
| 2005/0288011 | A1 | 12/2005 | Dutta |
| 2006/0040659 | A1 | 2/2006 | Karabinis |

FOREIGN PATENT DOCUMENTS

| | | |
|---|---|---|
| EP | 0 506 255 A2 | 9/1992 |
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 0 987 840 | 3/2000 |
| EP | 1 024 610 | 8/2000 |
| EP | 1 059 826 A1 | 12/2000 |
| EP | 1 122 894 | 8/2001 |
| EP | 1 193 989 A1 | 4/2002 |
| JP | 2002300169 * | 10/2002 |
| WO | WO 99/45652 | 9/1999 |
| WO | WO 01/54314 A1 | 7/2001 |

OTHER PUBLICATIONS

International Search Report and Written Opinion of the International Searching Authority for Application No. PCT/US2006/00101 mailed on May 31, 2006.

Lee, et al. "Satellite Over Satellite (SOS) Network: A Novel Architecture for Satellite Network" *Proceedings IEEE InfoCom* vol. 3, pp. 315-321 (Mar. 2000).

* cited by examiner

SATELLITES USING INTER-SATELLITE LINKS TO CREATE INDIRECT FEEDER LINK PATHS

REFERENCE TO RELATED APPLICATIONS

This application claims the benefit of, and priority to, provisional Application No. 60/655,148, filed Feb. 22, 2005, entitled "Satellites Using Inter-Satellite Links to Create Indirect Feeder Link Paths," the disclosure of which is hereby incorporated by reference herein as if set forth in its entirety.

FIELD OF THE INVENTION

This invention relates to wireless communications systems and methods, and more particularly to satellite communications systems and methods.

BACKGROUND

Satellite radiotelephone communications systems and methods are widely used for radiotelephone communications. Satellite radiotelephone communications systems and methods generally employ at least one space-based component, such as one or more satellites, that is/are configured to wirelessly communicate with a plurality of satellite radiotelephones.

A satellite radiotelephone communications system or method may utilize a single satellite antenna beam (antenna pattern) covering an entire area served by the system. Alternatively or in combination with the above, in cellular satellite radiotelephone communications systems and methods, multiple satellite beams (cells or antenna patterns) are provided, each of which can serve one or more substantially distinct geographic areas in an overall service region, to collectively serve an overall satellite footprint. Thus, a cellular architecture similar to that used in conventional terrestrial cellular radiotelephone systems and methods can be implemented in cellular satellite-based systems and methods. The satellite typically communicates with a radiotelephone over a bidirectional communications pathway, with radiotelephone communications signals being communicated from the satellite to the radiotelephone over a downlink, forward link or forward service link, and from the radiotelephone to the satellite over an uplink, return link or return service link.

The overall design and operation of cellular satellite radiotelephone systems and methods are well known to those having skill in the art, and need not be described further herein. Moreover, as used herein, the term "radiotelephone" includes cellular and/or satellite radiotelephones with or without a graphic display; Personal Communications System (PCS) terminals that may combine a radiotelephone with data processing, facsimile and/or data communications capabilities; Personal Digital Assistants (PDA) that can include a radio frequency transceiver and/or a pager, Internet/intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal", a "mobile terminal" or simply as a "terminal". As used herein, the term(s) "radioterminal," "radiotelephone," "mobile terminal" and/or "terminal" also include(s) any other radiating user device/equipment/source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Furthermore, as used herein, the term "space-based component" includes one or more satellites and/or one or more other objects/platforms (such as airplanes, balloons, unmanned vehicles, space crafts, missiles, etc.) that may have a regular and/or irregular trajectory above the earth at any altitude.

Cellular satellite communications systems and methods may deploy hundreds of cells, antenna patterns or spot beams over a space-based component footprint corresponding to a service area. It will be understood that large numbers of cells may be generally desirable, since a frequency reuse and a capacity of a cellular satellite communications system or method may both increase in direct proportion to the number of cells. Moreover, for a given space-based component footprint or service area, increasing the number of cells may also provide a higher gain per cell, which can increase a link robustness and improve a quality of service.

The uplink and downlink communications between the wireless terminals and the satellite may utilize one or more air interfaces, including proprietary air interfaces and/or conventional terrestrial cellular interfaces, such as, for example, Time Division Multiplexing (TDM), Time Division Multiple Access (TDMA), Code Division Multiplexing (CDM) and/or Code Division Multiple Access (CDMA) air interfaces and/or various adaptations and/or derivatives thereof. A single air interface may be used throughout the cellular satellite system. Alternatively, multiple air interfaces may be used for the satellite communications. See, for example, U.S. Pat. No. 6,052,560, issued Apr. 18, 2000, entitled Satellite System Utilizing a Plurality of Air Interface Standards and Method Employing the Same, by the present inventor Karabinis. In general, regardless of the air interface or interfaces that are used, each satellite cell generally uses at least one carrier and/or channel to provide signaling and/or communications service in a specified direction (forward or return). Thus, each satellite cell (satellite beam or satellite antenna pattern) must generally be configured to provide at least one return service link (carrier and/or channel) and at least one forward service link (carrier and/or channel) to serve at least one radioterminal.

The above description has focused on communications between a space-based component and wireless terminals. However, cellular satellite communications systems and methods also generally employ a bidirectional feeder link for providing communications between at least one gateway and the space-based component. The bidirectional feeder link includes a forward feeder link from a gateway to the space-based component and a return feeder link from the space-based component to the gateway. The forward feeder link and the return feeder link each uses one or more feeder link carriers and/or channels over a feeder link band of frequencies.

SUMMARY

Methods of providing a feeder link between a first geostationary satellite and a satellite gateway according to some embodiments of the invention include establishing a communications link between the satellite gateway and a second geo-stationary satellite, establishing an inter-satellite communications link between the first geo-stationary satellite and the second geo-stationary satellite, and communicating between the first geo-stationary satellite and the satellite gateway via the inter-satellite communications link and the communications link.

The satellite gateway may include a first satellite gateway, and establishing a communications link between the first satellite gateway and the second geo-stationary satellite may include establishing an inter-gateway communications link between the first satellite gateway and a second satellite gateway and establishing a satellite communications link between the second satellite gateway and the second geo-stationary satellite.

Establishing the communications link between the satellite gateway and the second geo-stationary satellite may include establishing a communications link using a feeder link frequency.

The feeder link frequency may include a frequency in the Ku-band.

Establishing the inter-satellite communications link between the first geo-stationary satellite and the second geo-stationary satellite may include establishing an inter-satellite communications link using one of an optical communications link, an infrared communications link, an ultraviolet communications link and/or an RF communications link between the first geo-stationary satellite and the second geo-stationary satellite.

Establishing an inter-satellite communications link between the first geo-stationary satellite and the second geo-stationary satellite may include establishing a first inter-satellite communications link between the first geo-stationary satellite and a third geo-stationary satellite and establishing a second inter-satellite communications link between the third geo-stationary satellite and the second geo-stationary satellite.

Establishing the inter-gateway communications link may include establishing a first inter-gateway communications link between the first satellite gateway and a third satellite gateway and establishing a second inter-gateway communications link between the third satellite gateway and the second satellite gateway.

Some methods may further include providing a feeder link data stream, segmenting the feeder link data stream into a plurality of packets, and routing at least one of the plurality of packets between the first geo-stationary satellite and the satellite gateway via the second geo-stationary satellite.

Some methods may further include routing at least another of the plurality of packets between the first geo-stationary satellite and the satellite gateway via a different route than the at least one of the plurality of packets.

Some methods may further include establishing a service link between the first geo-stationary satellite and at least one wireless terminal over a satellite service link frequency, and transmitting data received over the feeder link to the at least one wireless terminal.

Some methods may further include receiving data over the service link, and transmitting the data received over the service link to the satellite gateway via the feeder link.

The first geo-stationary satellite may be configured to transmit wireless communications signals over a frequency in a satellite frequency band to a satellite footprint in which an ancillary terrestrial component is located. Accordingly, some methods may further include transmitting a wireless communications signal from the ancillary terrestrial component to a wireless terminal located within the satellite footprint over a frequency in the satellite frequency band.

A method of providing a feeder link between a first geo-stationary satellite and a first satellite gateway according to some embodiments of the invention includes communicating between the first geo-stationary satellite and the first satellite gateway via at least one second geo-stationary satellite.

Communicating between the first geo-stationary satellite and the first satellite gateway via at least one second geo-stationary satellite may include establishing a direct feeder link between the first satellite gateway and the at least one second geo-stationary satellite.

Establishing a direct feeder link between the first satellite gateway and the at least one second geo-stationary satellite may include establishing a direct feeder link using a feeder link frequency. The feeder link frequency may include a frequency in the Ku-band.

Communicating between the first geo-stationary satellite and the first satellite gateway may include communicating via at least one second satellite gateway.

Some methods may further include establishing a communications link between the first satellite gateway and the at least one second satellite gateway, and establishing a direct feeder link between at least one second satellite gateway and the at least one second geo-stationary satellite.

The communications link between the first satellite gateway and the second satellite gateway may include an inter-gateway communications link.

Some methods may further include providing a feeder link data stream, segmenting the feeder link data stream into a plurality of packets, and routing at least one of the plurality of packets between the first geo-stationary satellite and the first satellite gateway via the at least one second geo-stationary satellite. Further methods may include routing at least another of the plurality of packets between the first geo-stationary satellite and the first satellite gateway via a different route than the at least one of the plurality of packets.

Methods of processing feeder link communications in a satellite communications system according to further embodiments of the invention include establishing a direct feeder link between a satellite gateway and a first geo-stationary satellite using a feeder link frequency, receiving, at the first geo-stationary satellite, a communications signal from the satellite gateway over the direct feeder link, determining if the communications signal received over the direct feeder link is intended for a second geo-stationary satellite, and responsive to a determination that the communications received over the direct feeder link is intended for a second geo-stationary satellite, determining if an inter-satellite link exists between the first geo-stationary satellite and the second geo-stationary satellite.

Some methods may further include responsive to a determination that the communications received over the direct feeder link is intended for a second geo-stationary satellite and that an inter-satellite link exists between the first geo-stationary satellite and the second geo-stationary satellite, forwarding the communications signal to the second geo-stationary satellite over the inter-satellite link.

Some methods may further include responsive to a determination that the communications received over the feeder link is intended for a second geo-stationary satellite and that no inter-satellite link exists between the first geo-stationary satellite and the second geo-stationary satellite, establishing an inter-satellite link between the first geo-stationary satellite and the second geo-stationary satellite and forwarding the communications signal to the second geo-stationary satellite over the established inter-satellite link.

Methods of processing feeder link communications in a satellite communications system according to some embodiments of the invention include establishing an inter-satellite link between a first geo-stationary satellite and a second geo-stationary satellite, receiving, at the first geo-stationary satellite, a communications signal from the second geo-stationary satellite over the inter-satellite link, determining if the communications signal received over the inter-satellite link may be intended for a satellite gateway, and responsive to a determination that the communications received over the inter-satellite link may be intended for a satellite gateway, determining if a feeder link exists between the first geo-stationary satellite and the satellite gateway.

Some methods may further include, responsive to a determination that the communications received over the feeder link may be intended for a satellite gateway and that a feeder link exists between the first geo-stationary satellite and the satellite gateway, forwarding the communications signal to the satellite gateway over the feeder link.

Some methods may further include, responsive to a determination that the communications signal received over the inter-satellite link may be intended for a satellite gateway and that no feeder link exists between the first geo-stationary satellite and the satellite gateway, establishing a feeder link between the first geo-stationary satellite and the satellite gateway and forwarding the communications signal to the satellite gateway over the established feeder link.

A satellite communications system according to some embodiments of the invention includes first and second geo-stationary satellites configured to establish an inter-satellite communications link therebetween, and a satellite gateway configured to establish a direct feeder link with one of the first and second geo-stationary satellites and to establish an indirect feeder link with the other of the first and second geo-stationary satellites using the inter-satellite communications link and the direct feeder link.

The satellite gateway may include a first satellite gateway, and the system may further include a second satellite gateway configured to establish an inter-gateway communications link with the first satellite gateway and to establish an indirect feeder link with the other of the first and second geo-stationary satellites using the inter-satellite communications link, the direct feeder link, and the inter-gateway communications link.

The system may further include an intermediate satellite gateway; the inter-gateway communications link between the first and second satellite gateways may include a first intermediate inter-gateway communications link between the first satellite gateway and the intermediate satellite gateway, and a second intermediate inter-gateway communications link between the intermediate satellite gateway and the second satellite gateway.

The inter-satellite communications link may include one of an optical communications link, an infrared communication link, an ultraviolet communications link and/or an RF communications link.

The system may further include an intermediate geo-stationary satellite, the inter-satellite communications link between the first and second geo-stationary satellites may include a first intermediate inter-satellite communications link between the first geo-stationary satellite and the intermediate geo-stationary satellite, and a second intermediate inter-satellite communications link between the intermediate geo-stationary satellite and the second geo-stationary satellite.

The system may further include a routing table stored at the satellite gateway and configured to provide routing information to the satellite gateway to assist the satellite gateway in selecting a route for establishing the feeder link.

A satellite communications system according to further embodiments of the invention includes a first geo-stationary satellite configured to transmit wireless communications signals to a plurality of wireless terminals in a satellite footprint including one or more satellite cells over one or more satellite forward service link frequencies, a second geo-stationary satellite, and a satellite gateway configured to establish a direct feeder link with the second geo-stationary satellite, the first geo-stationary satellite may be configured to establish an indirect feeder link with the satellite gateway using the direct feeder link between the satellite gateway and the second geo-stationary satellite.

The satellite gateway may include a first satellite gateway, the system may further include a second satellite gateway configured to establish an inter-gateway communications link with the first satellite gateway, at least one of the first or second geo-stationary satellites may be configured to establish an indirect feeder link with the second satellite gateway using the inter-gateway communications link between the first and second satellite gateways and the direct feeder link between the first satellite gateway and the second geo-stationary satellite.

Some embodiments of the invention provide a satellite gateway configured to establish an indirect feeder link with a geo-stationary satellite.

A satellite gateway according to some embodiments of the invention includes an antenna, and an electronics system coupled to the antenna configured to establish a direct feeder link with a first geo-stationary satellite via the antenna and an indirect feeder link with a second geo-stationary satellite via an inter-satellite link between the first geo-stationary satellite and the second geo-stationary satellite.

The satellite gateway may further include a routing table stored at the satellite gateway and configured to provide routing information to the satellite gateway to assist the satellite gateway in selecting a route for establishing the indirect feeder link.

A satellite gateway according to some embodiments of the invention includes an antenna, and an electronics system coupled to the antenna and configured to receive a communications signal from a first geo-stationary satellite over the direct feeder link, to determine if the communications signal received over the direct feeder link may be intended for a second satellite gateway, and responsive to a determination that the communications received over the direct feeder link may be intended for a second satellite gateway, to forward the communications to the second satellite gateway via an inter-gateway link.

A satellite gateway according to some embodiments of the invention includes an antenna, and an electronics system coupled to the antenna and configured to receive a feeder link communications signal from a second satellite gateway over an inter-gateway link, to identify a geo-stationary satellite for which the feeder link communications signal may be intended, to establish an indirect feeder link with the geo-stationary satellite for which the feeder link communications signal may be intended, and to forward the feeder link communications signal to the geo-stationary satellite for which the feeder link communications signal may be intended.

A geo-stationary satellite according to some embodiments of the invention is configured to establish an indirect feeder link with a satellite gateway.

A geo-stationary satellite may further include a routing table stored at the geo-stationary satellite and configured to provide routing information to the geo-stationary satellite to assist the geo-stationary satellite in selecting a route for establishing the indirect feeder link.

A geo-stationary satellite according to some embodiments of the invention includes an antenna, and an electronics system configured to establish a direct feeder link with a satellite gateway using a feeder link frequency, to receive a communications signal from the satellite gateway over the direct feeder link, to determine if the communications signal may be intended for a second geo-stationary satellite, and to establish an inter-satellite link with the second geo-stationary satellite. The electronics system may be further configured to forward the communications signal to the second geo-stationary satellite over the inter-satellite link.

A geo-stationary satellite according to some embodiments of the invention includes an antenna, and an electronics system configured to establish an inter-satellite link with a second geo-stationary satellite, to receive a communications signal from the second geo-stationary satellite over the inter-satellite link, to determine if the communications signal may be intended for a satellite gateway, and to establish a direct feeder link with the second geo-stationary satellite. The electronics system may be further configured to forward the communications signal to the satellite gateway over the direct feeder link.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
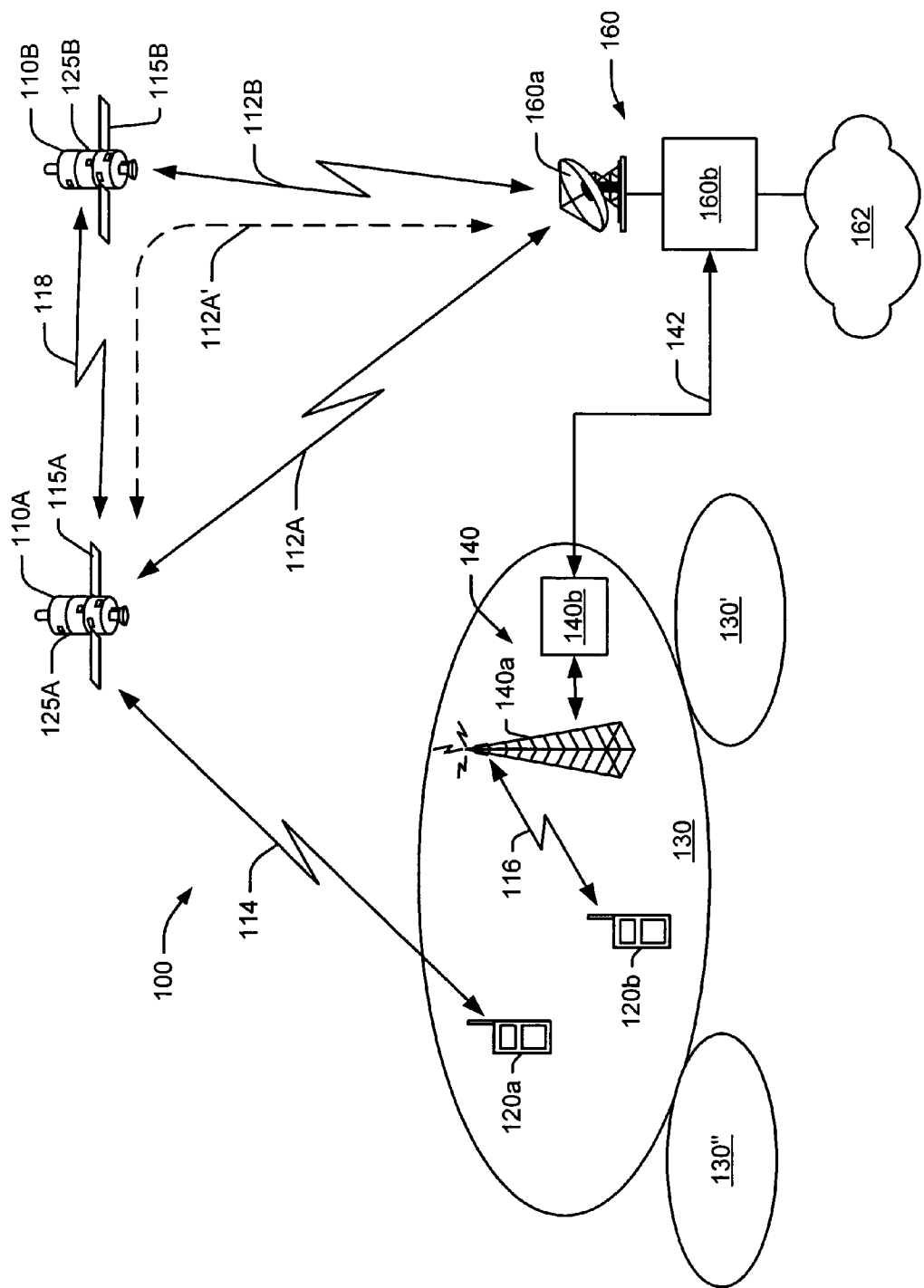
FIGS. 1-2 are schematic diagrams of cellular satellite communications systems and methods according to embodiments of the invention.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected" or "coupled" to another element, the element can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first space-based component below could be termed a second space-based component, and similarly, a second space-based component may be termed a first space-based component without departing from the teachings of the present invention. As used herein, the term "and/or" includes any and all combinations of one or more of the associated listed items. The symbol "/" is also used as a shorthand notation for "and/or".

Moreover, as used herein, "substantially the same" band(s) means that two or more bands being compared substantially overlap, but that there may be some areas of non-overlap, for example at a band end and/or elsewhere. "Substantially the same" air interface(s) means that two or more air interfaces being compared are similar but need not be identical. Some differences may exist in one air interface (i.e., a satellite air interface) relative to another air interface (i.e., a terrestrial air interface) to account for one or more different characteristics/concerns that may exist between the terrestrial and satellite communications environments. For example, a different vocoder rate may be used for satellite communications compared to a vocoder rate that may be used for terrestrial communications (i.e., for terrestrial communications, voice may be compressed ("vocoded") to approximately 9 to 13 kbps, whereas for satellite communications a vocoder rate of approximately 2 to 4 kbps, for example, may be used); a different forward error correction code, different interleaving depth, and/or different spread-spectrum codes may also be used, for example, for satellite communications compared to the forward error correction code, interleaving depth, and/or spread spectrum codes (i.e., Walsh codes, short codes, long codes, and/or frequency hopping codes) that may be used for terrestrial communications.

Some embodiments of the present invention may arise from recognition that a satellite that is placed in a particular orbital slot (location) may not be able to obtain a desired amount of feeder link spectrum, over a desired set of frequencies, that may be desired by the satellite to establish direct communications with a satellite gateway. For example, feeder link spectrum such as, for example, Ku-band feeder link spectrum, may not be available to a satellite at a particular orbital slot (location) that may be optimum or nearly optimum for the satellite.

According to exemplary embodiments of the present invention, a satellite may be configured to establish at least one inter-satellite communications link with at least one other satellite located at an orbital location at which feeder link spectrum is available to the at least one other satellite. The at least one inter-satellite communications link between the satellite and the at least one other satellite may be used in conjunction with the feeder link spectrum available to the at least one other satellite to establish an indirect feeder link between the satellite and a satellite gateway, thereby providing feeder link communications to the satellite. The at least one inter-satellite communications link may be a unidirectional and/or bidirectional link that is configured to use frequencies of an optical band, an infra-red band, an ultra-violet band, a Radio Frequency (RF) band and/or any other band of frequencies. Embodiments of the invention may also be combined with at least one conventional direct feeder link between the satellite and the satellite gateway and/or other ground-based facility.

FIG. 1 is a schematic diagram of cellular satellite communications systems and methods according to embodiments of the invention. As shown in FIG. 1, these cellular satellite communications systems and methods 100 include a first satellite 110A and a second satellite 110B, which may be geostationary orbital satellites. The first and second satellites 110A, 110B may include communications antennas 115A, 115B and electronics systems 125A, 125B configured to control operations of the satellites. The first satellite 110A is configured to transmit wireless communications signals to one or more wireless terminals 120a, in a satellite footprint including one or more satellite cells 130-130" using one or more satellite forward service link (downlink) frequencies $f_D$ over one or more satellite links 114. The first satellite 110A is configured to receive wireless communications from the one or more wireless terminals 120a in the satellite cells 130-130" over one or more satellite return service link (uplink) frequencies $f_U$. The first and second satellites 110A, 110B may be configured to establish at least one inter-satellite communications link 118 to facilitate communications therebetween.

An ancillary terrestrial network (ATN), comprising at least one ancillary terrestrial component (ATC) 140, which may include an antenna 140a and an electronics system 140b, is configured to receive wireless communications signals from, for example, a second wireless terminal 120b over an uplink frequency $f'_U$ within the satellite frequency band over a wireless link 116. The frequency $f'_U$ may be the same as an uplink or downlink frequency used for communicating with the satellite 110A in the satellite cell 130 in which the wireless terminal 120b is located and/or in an adjacent or remotely-located satellite cell 130', 130". Thus, as illustrated in FIG. 1, wireless terminal 120a may be communicating with the satellite 110A using a frequency in the satellite frequency band while wireless terminal 120b may be communicating with the ancillary terrestrial component 140, also using a frequency in the satellite frequency band.

Still referring to FIG. 1, embodiments of satellite communications systems/methods 100 can include at least one satellite gateway 160 that can include an antenna 160a and an electronics system 160b. The satellite gateway 160 may be connected to other networks 162, including terrestrial and/or other wired and/or wireless communications networks such as, for example, a public switched telephone network, a cellular/PCS network and/or the Internet.

The satellite gateway 160 communicates with the satellite 110A over a satellite feeder link 112A. The satellite gateway 160 also communicates with ancillary terrestrial components 140 in the ancillary terrestrial network, generally over a terrestrial link 142.

In order to provide geographically widespread coverage of a mobile satellite radiotelephone communications system as illustrated in FIG. 1, it may be desirable to provide multiple satellites in different geostationary orbital locations. For example, as illustrated in FIG. 1, a satellite communications system/method 100 may include a first satellite 110A positioned at a first orbital location and a second satellite 110B positioned at a second orbital location. Each satellite 110A, 110B may service a particular geographic footprint in the system. As noted above, a satellite that is placed in a particular orbital location may not be able to obtain a desired amount of feeder link spectrum, over a desired set of frequencies that may be desired by the satellite to establish direct communications with the satellite gateway 160. For example, feeder link spectrum such as, for example, Ku-band feeder link spectrum, may not be available to the satellite 110A at a particular orbital slot that may be optimum or nearly optimum for the satellite in order to provide coverage to a desired geographic footprint.

In addition, feeder link spectrum may become temporarily unavailable to a satellite due to, for example, traffic conditions, atmospheric conditions, service/maintenance conditions, and/or for other reasons. For any of these reasons, a first satellite 110A may not be able to establish a direct feeder link connection 112A with the satellite gateway 160. According to some embodiments of the invention, the first satellite 110A may establish an indirect feeder link connection 112A' with the satellite gateway 160 by using an inter-satellite link 118 between the first satellite 110A and the second satellite 110B, and a direct satellite feeder link 112B between the second satellite 110B and the gateway 160.

Figure 2:
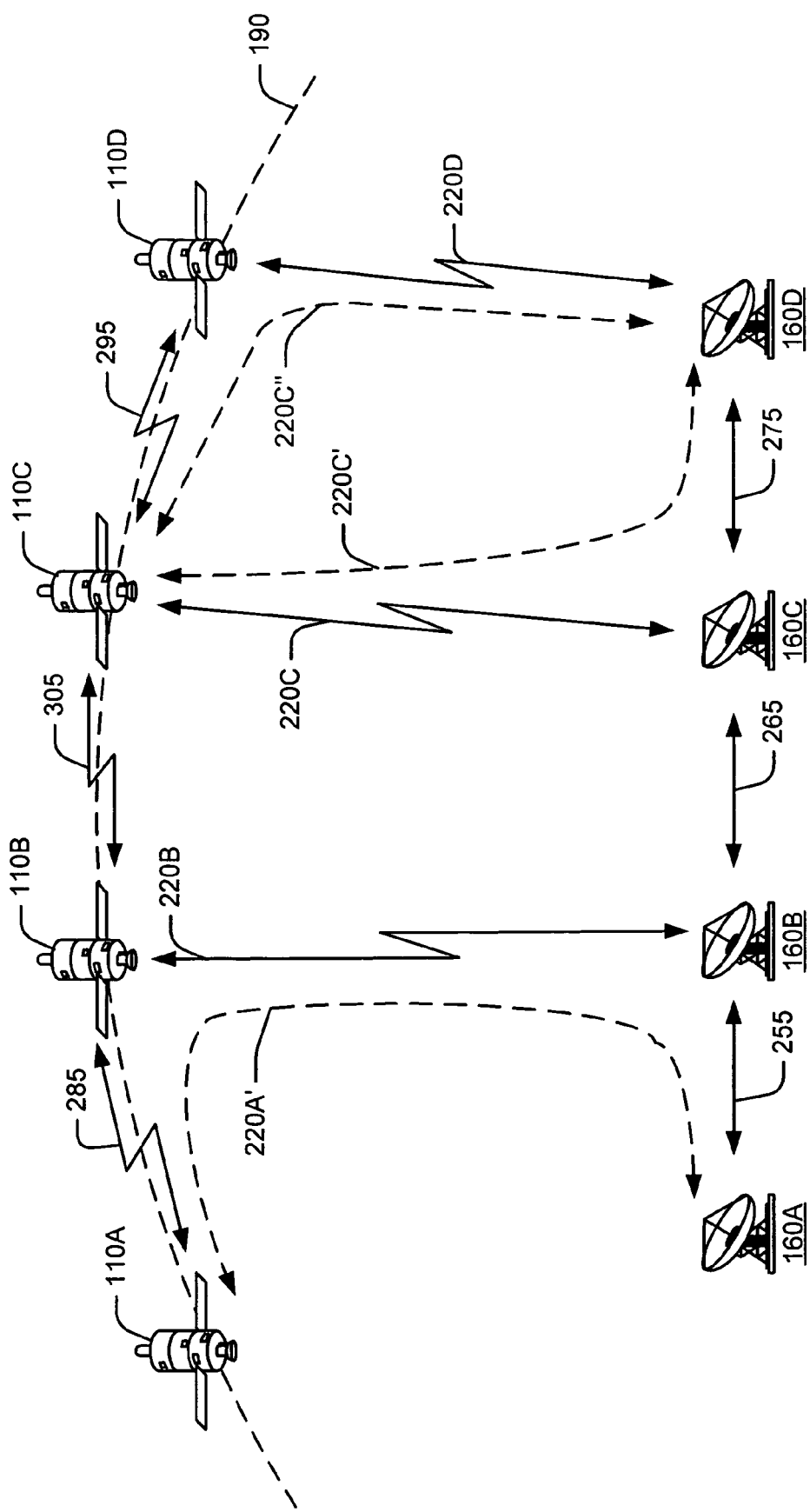

FIG. 2 illustrates a satellite configuration comprising two "central" satellites (110B, 110C) and two "wing" satellites (110A, 110D). Corresponding satellite gateways (160A through 160D) are also shown. These satellites may be located on a predetermined geostationary arc 190 in some embodiments, but need not be so located in other embodiments. Moreover, the sequence of satellites 110A-D along the geostationary arc 190 is only for purposes of illustration. The satellites 110B, 110C communicate with respective satellite gateways 160B, 160C over respective direct feeder links 220B, 220C using, for example, Ku-band frequencies. Satellite 110A may communicate with a respective satellite gateway 160A indirectly by establishing an inter-satellite link 285 with satellite 110B, and using feeder link spectrum that is available to satellite 110B to communicate with its respective satellite gateway 160A. The feeder link spectrum available to satellite 110B may not permit the satellite 110B to communicate directly with the satellite gateway 160A. However, as noted above, the satellite 110B may be able to establish a direct feeder link connection 220B with a respective satellite gateway 160B, which may in turn be able to establish an inter-gateway communication link 255 with the satellite gateway 160A. Accordingly, the indirect feeder link 220A' between satellite 110A and gateway 160A may also include at least one inter-gateway communications link 255 between the satellite gateways 160A, 160B. The inter-gateway communications link 255 may include, for example, a microwave communications link and/or a wireline communications link.

A satellite may establish feeder links with multiple satellite gateways. For example, while the satellite 110C may have a direct feeder link to satellite gateway 160C, the satellite 110C may establish an indirect feeder link 220C' with another satellite gateway 160D using the feeder link 220C with the satellite gateway 160C and an inter-gateway link 275 between the satellite gateway 160C and the satellite gateway 160D. Alternatively, if another satellite 110D has a direct feeder link 220D with the satellite gateway 160D, the satellite 110C may establish an indirect feeder link 220C" with the satellite gateway 160D using the direct feeder link 220D between the satellite 110D and the satellite gateway 160D and an inter-satellite link 295 between the satellite 110C and the satellite 110D.

In some embodiments, direct communications between satellite 110A and gateway 160A and/or an alternate ground-based facility and satellite 110D and gateway 160D and/or an alternate ground-based facility also may be provided using direct feeder links. Moreover, in some embodiments, respective satellites 110B, 110C may communicate directly with respective satellite gateways 160A, 160D. Although in FIG. 2, satellite 110A is illustrated using an inter-satellite link 285 with satellite 110B, an inter-satellite link with satellite 110C may be established in lieu of, or in addition to, the illustrated inter-satellite link between satellites 110A and 110B. Also, even though satellite 110B is illustrated communicating with a gateway 160B that is separate from any of the other satellite gateways (160A, 160C, 160D), satellite gateway 160B may be included, partially or completely, in any of the other satellite gateways (160A, 160C, 160D) or be distributed between the satellite gateways 160A, 160C, 160D. As shown in FIG. 2, at least some of the gateways 160A, 160B, 160C, 160D may be configured with inter-gateway communication links (255, 265, 275) to relay feeder link communications and/or other communications therebetween.

It will be understood that a satellite gateway such as satellite gateway 160A may include a plurality of geographically separated satellite gateways that, in some embodiments, may be inter-connected and satellite 110B may communicate feeder link information of satellite 110A to/from the plurality of geographically separated satellite gateways by using feeder link spot beams and/or at least two substantially orthogonal polarizations.

Figure 3:
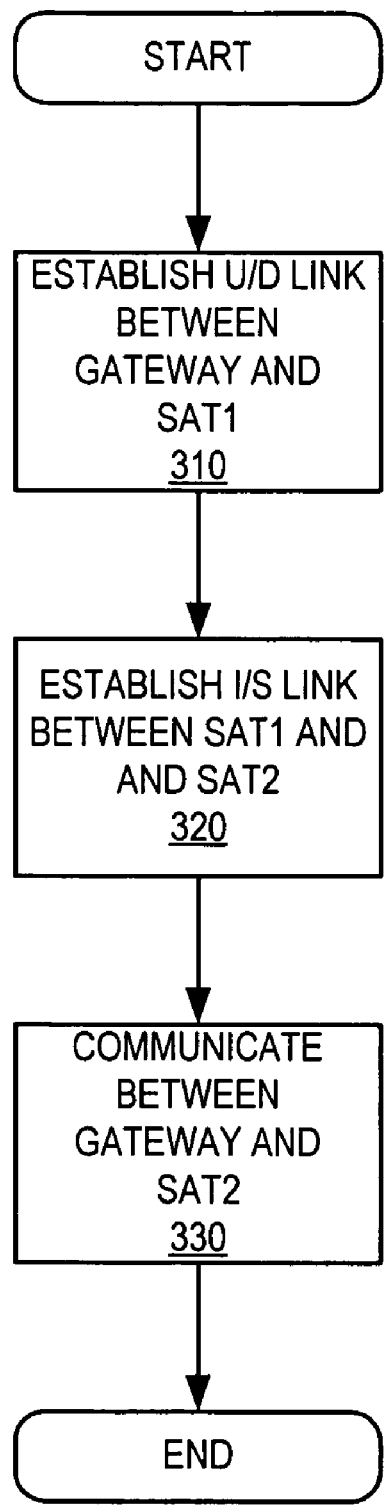
FIGS. 3-5 are flowcharts illustrating operations of cellular satellite communications systems and components thereof according to some embodiments of the invention.

Operations associated with providing a feeder link between a satellite and a satellite gateway according to some embodiments of the invention are illustrated in FIG. 3. As shown therein, such operations may include establishing an up/down (U/D) communications link between the satellite gateway and a first satellite SAT1 (block 310), establishing an inter-satellite (I/S) communications link between the first satellite SAT1 and a second satellite SAT2 (block 320), and communicating between the second satellite SAT2 and the satellite gateway via the inter-satellite communications link and the up/down communications link (block 330). The inter-satellite link between satellites SAT1 and SAT2 may be established through a third, intermediate, satellite SAT12. Thus, the inter-satellite communications link may include a first inter-satellite communications link between the first satellite SAT1 and the third satellite SAT3 and a second inter-satellite communications link between the third satellite SAT3 and the second satellite SAT2.

The communications link between the satellite gateway and the second satellite may be established over a feeder link frequency, such as a frequency in the Ku band, C-band and/or any other band.

In some cases, the first satellite SAT1 may not be capable of establishing a direct feeder link with the satellite gateway. Thus, the communications link between the second satellite SAT2 and the satellite gateway may be accomplished using an intermediary satellite gateway. For example, the first satellite SAT1 may establish a direct feeder link with a second satellite gateway. An inter-gateway communications link may be established between the first satellite gateway and the second satellite gateway. Accordingly, an indirect feeder link may be established between the second satellite SAT2 and the satellite gateway through the inter-satellite communications link, the direct feeder link and the inter-gateway communications link.

Likewise, a direct inter-satellite communications link between the first satellite SAT1 and the second satellite SAT2 may not be available. Thus, an inter-satellite communications link between the first satellite SAT1 and the second satellite SAT2 may be established, by establishing a first inter-satellite communications link between the first satellite SAT1 and a third satellite SAT3 and establishing a second inter-satellite communications link between the third satellite SAT3 and the second satellite SAT2.

Figure 4:
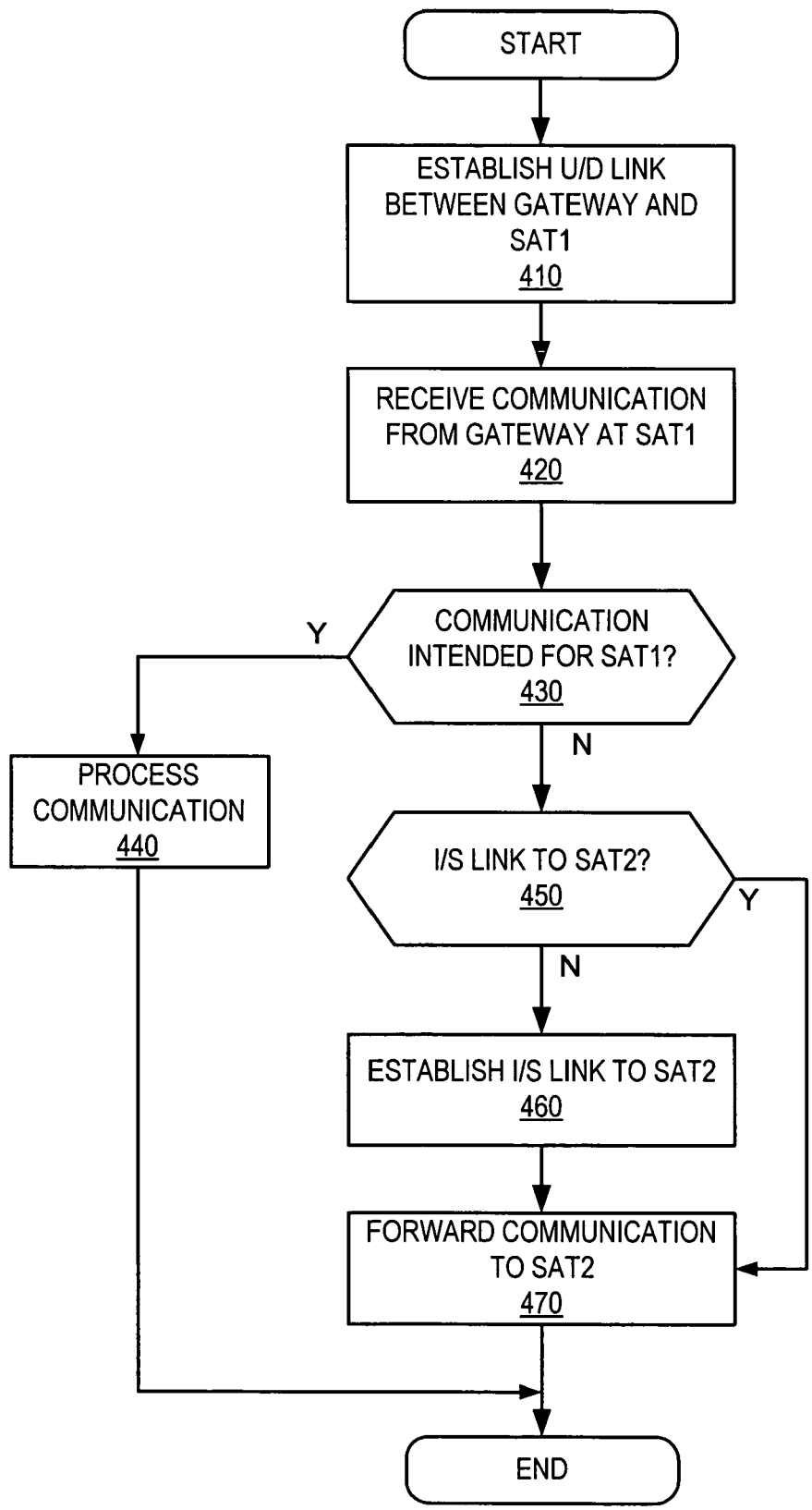

Operations associated with processing feeder link communications in a satellite communications system including first and second satellites SAT1, SAT2 and a satellite gateway according to further embodiments of the invention are illustrated in FIG. 4. As shown therein, such operations may include establishing a direct feeder link between the satellite gateway and the first satellite SAT1 using a feeder link frequency (block 410), receiving, at the first satellite SAT1, a communications signal from the satellite gateway over the direct feeder link (block 420), and determining if the communications signal received over the direct feeder link is intended for the first satellite SAT1 (block 430). If the communications signal received over the direct feeder link is intended for the first satellite SAT1, the communications signal is processed at the first satellite (block 440). If, however, the communications signal received over the direct feeder link is intended for the second satellite SAT2, a determination is made whether an inter-satellite link exists between the first satellite and the second satellite SAT2 (block 450).

If the communications received over the feeder link is intended for the second satellite SAT2 and no inter-satellite link exists between the first satellite and the second satellite, an inter-satellite link is established between the first satellite SAT1 and the second satellite SAT2 (block 460) and the communications signal is forwarded to the second satellite SAT2 over the established inter-satellite link (block 470).

If the communications received over the direct feeder link is intended for a second satellite SAT2 and an inter-satellite link exists between the first satellite SAT1 and the second satellite SAT2, the communications signal is forwarded to the second satellite SAT2 over the inter-satellite link (block 470).

Figure 5:
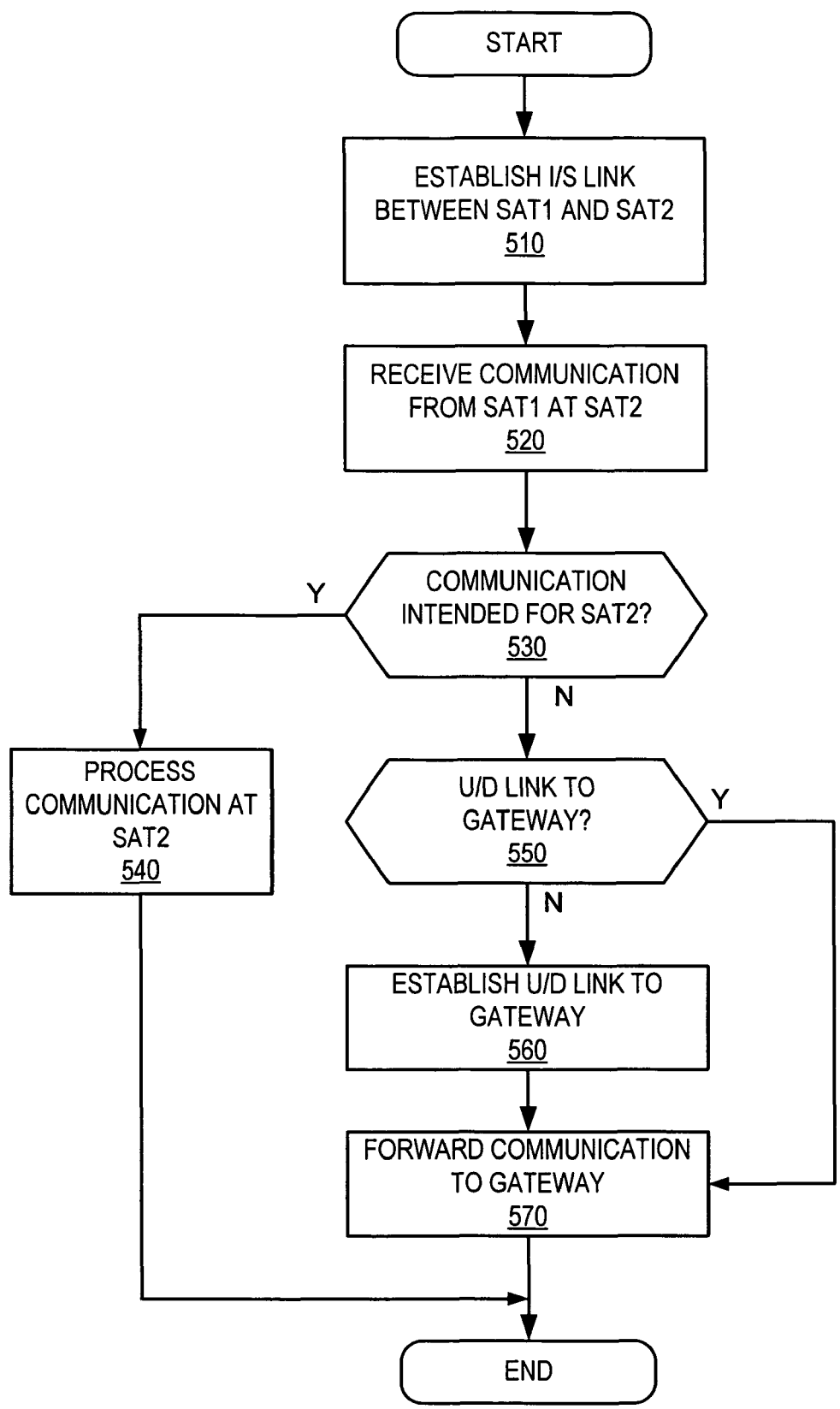

Further operations associated with processing feeder link communications in a satellite communications system including first and second satellites SAT1, SAT2 and a satellite gateway according to some embodiments of the invention are illustrated in FIG. 5. As shown therein, an inter-satellite link is established between the first satellite SAT1 and the second satellite SAT2 (block 510). A communications signal from the first satellite is received at the second satellite SAT2 over the inter-satellite link (block 520). A determination is made as to whether the communications signal received over the inter-satellite link is intended for the second satellite SAT2 (block 530). If the communications signal is intended for the second satellite SAT2, then the communications signal is processed accordingly (block 540). However, if the communications signal is intended for the satellite gateway, a determination is made if a feeder link exists between the second satellite SAT2 and the satellite gateway (block 550). If no feeder link exists between the second satellite SAT2 and the satellite gateway, a feeder link is established between the second satellite SAT2 and the gateway (block 560). The communications signal may then be forwarded to the satellite gateway (block 570).

According to some embodiments of the invention, a satellite and/or a gateway in a satellite communications system may maintain a routing table by which routes for feeder links may be selected. In some embodiments, the routing table at a particular satellite/gateway may contain entries for each other satellite/gateway in the system with which the particular satellite/gateway can establish a direct communications link. Each entry may include information concerning link type, such as whether a link is an inter-satellite link (I/S) or a satellite-to-ground up/down link (U/D). The entry may further indicate link status, such as whether a link is active or inactive. An active link may further be indicated as free or busy. Links may be ranked in order of priority based on cost, available bandwidth, security, and or other criteria. A portion of an exemplary routing table is illustrated in Table 1, below.

TABLE 1

Feeder Link Routing Table for Satellite 110B

| Link with | Destinations | Type | Status |
|---|---|---|---|
| satellite 110A | N/A | I/S | Active - Free |
| satellite 110C | 110D, 160A, 160B, 160C, 160D | I/S | Inactive |
| gateway 160B | 160A, 160C, 160D, 110C, 110D | U/D | Active - Free |

Table 1 illustrates portions of a feeder link routing table for the satellite 110B shown in FIG. 2. The routing table provides information to assist the satellite 110B with identifying and/or selecting an appropriate route for feeder link communications with other satellite(s)/gateway(s). As shown in Table 1, the satellite 110B may establish direct communications links with the satellites 110A, 110C and the gateway 160B (see FIG. 2). As indicated by the "Destinations" field of row 2, indirect links including indirect feeder links may be established between the satellite 110B and the satellites/gateways 110D, 160A, 160B, 160C, and/or 160D using the direct link 305 to satellite 110C. Likewise, as indicated by the "Destinations" field of row 3, indirect links including indirect feeder links may be established between satellite 110B and the satellites/gateways 110C, 110D, 160A, 160C, and/or 160D using the direct link 220B to the gateway 160B. By using the routing table, the satellite 110B may establish a feeder link, either direct or indirect, with another satellite or gateway in the system. Information regarding which destinations are available from a particular satellite/gateway may be periodically updated in the system to account for changes in link status and/or availability.

The free/active status of the routes shown in Table 1, are provided as examples only. The route status could include a metric, such as a percent utilization, or a number such as bandwidth available that may provide more information in selecting potential routes. Further information, such as the status of downstream links could also be collected from other satellites/gateways and included in the routing table.

As an example of the use of the routing table, the satellite 110B may desire to establish a feeder link connection with the gateway 160A. Consulting its routing table, the satellite 110B would note that to reach the gateway 160A, the indirect feeder link could be routed through either the satellite 110C or the gateway 160B. As the link to the satellite 110C is listed as "Inactive" while the status of the link to the gateway 160B is listed as "Active-Free", the satellite 110B may route the feeder link through the gateway 160B. If the status of the link to the gateway 160B were instead listed as "Active-Busy", the satellite 110B may instead establish/activate the link with the satellite 110C and route the indirect feeder link through the satellite 110C.

According to some embodiments, feeder link data may be segmented, for example into packets, which may be sent via whichever feeder link, direct or indirect, can best transport the packet according to the relevant criteria. Thus, a satellite system according to some embodiments of the invention may be configured to dynamically route feeder link communications as network conditions change. Such a system may be capable of handling feeder link traffic more efficiently.

It will be understood that the methods of establishing an indirect feeder link between a satellite and a gateway, as described herein, may also be applied to a space-based component comprising one or more non-geostationary elements such as one or more non-geostationary satellites. It will also be understood that, in some embodiments, an indirect feeder link may comprise a plurality of dimensions such as a plurality of polarization, phase and/or spatial dimensions. Furthermore, it will be appreciated by those skilled in the art that an indirect feeder link may be used to provide any information, unidirectionally or bi-directionally, between at least one element of a space-based component and at least one gateway including information related to forming and/or adjusting one or more antenna patterns of at least one element of the space-based component. In some embodiments of the invention, an element of a space-based component that is associated with an indirect feeder link is an element of the space-based component that is not configured to provide communications directly to a radioterminal. Instead, the element is configured to provide the indirect feeder link and is coupled to at least one second element of the space-based component, wherein the second element of the space-based component is configured to provide communications directly to the radioterminal.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of providing a feeder link between a first geo-stationary satellite and a satellite gateway, the method comprising:
    establishing a communications link between the satellite gateway and a second geo-stationary satellite;
    establishing an inter-satellite communication link between the first geo-stationary satellite and the second geo-stationary satellite; and
    communicating feeder link information between the first geo-stationary satellite and the satellite gateway via the inter-satellite communications link and the communications link, wherein the first geo-stationary satellite is configured to transmit wireless communications signals over a frequency in a satellite frequency band to a satellite footprint in which an ancillary terrestrial component is located, the method further comprising transmitting a wireless communications signal from the ancillary terrestrial component directly to a terrestrial wireless terminal located within the satellite footprint over a frequency in the satellite frequency band.

2. The method of claim 1, wherein the satellite gateway comprises a first satellite gateway, and establishing a communications link between the satellite gateway and the second geo-stationary satellite comprises establishing an inter-gateway communications link between the first satellite gateway and a second satellite gateway and establishing a satellite communications link between the second satellite gateway and the second geo-stationary satellite.

3. The method of claim 1, wherein the feeder link frequency comprises a frequency in the Ku-band and/or a frequency in the C-band.

4. The method of claim 1, wherein establishing the inter-satellite communications link between the first geo-stationary satellite and the second geo-stationary satellite comprises establishing an inter-satellite communications link using one of an optical communications link, an infrared communications link, an ultraviolet communications link and/or an RF communications link between the first geo-stationary satellite and the second geo-stationary satellite.

5. The method of claim 1, wherein establishing the inter-satellite communications link between the first geo-stationary satellite and the second geo-stationary satellite comprises establishing a first inter-satellite communications link between the first geo-stationary satellite and a third geo-stationary satellite and establishing a second inter-satellite communications link between the third geo-stationary satellite and the second geo-stationary satellite.

6. The method of claim 1, wherein establishing the inter-gateway communications link comprises establishing a first inter-gateway communications link between the first satellite gateway and a third satellite gateway and establishing a second inter-gateway communications link between the third satellite gateway and the second satellite gateway.

7. The method of claim 1, further comprising:
providing a feeder link data stream;
segmenting the feeder link data stream into a plurality of packets; and
routing at least one of the plurality of packets between the first geo-stationary satellite and the satellite gateway via the second geo-stationary satellite.

8. The method of claim 7, further comprising routing at least another of the plurality of packets between the first geo-stationary satellite and the satellite gateway via a different route than the at least one of the plurality of packets.

9. The method of claim 1, further comprising establishing a service link between the first geo-stationary satellite and at least one wireless terminal over a satellite service link frequency; and
transmitting data received over the feeder link to the at least one wireless terminal.

10. The method of claim 9, further comprising receiving data over the service link; and
transmitting the data received over the service link to the satellite gateway via the feeder link.

* * * * *

UNITED STATES PATENT AND TRADEMARK OFFICE
CERTIFICATE OF CORRECTION

PATENT NO. : 7,738,837 B2  
APPLICATION NO. : 11/313572  
DATED : June 15, 2010  
INVENTOR(S) : Karabinis Page 1 of 1

It is certified that error appears in the above-identified patent and that said Letters Patent is hereby corrected as shown below:

On Title Page:
Item (54) References Cited, U.S. Patent Documents: Please add the following references:
-- 5,584,046   12/1996   Martinez --
-- 5,555,257   09/1996   Dent --
-- 5,511,233   04/1996   Otten --
-- 5,448,623   09/1995   Wiedeman et al. --
-- 5,446,756   08/1995   Mallincrodt --
-- 5,394,561   02/1995   Freeburg --
-- 5,339,330   08/1994   Mallincrodt --
-- 5,303,286   04/1994   Wiedeman--
-- 5,073,900   12/1991   Mallincrodt --
-- 4,901,307   02/1990   Gilhousen et al. --
-- 2003/0003815   01/2003   Yamada --
-- 2003/0022625   01/2003   Otten et al. --
-- 2003/0054762   03/2003   Karabinis --
-- 2003/0054814   03/2003   Karabinis et al. --
-- 2003/0054815   03/2003   Karabinis --
-- 2004/0102156   05/2004   Loner --
-- 2002/0122408   09/2002   Mullins --
-- 2002/0146979   10/2002   Regulinski et al. --
-- 2002/0177465   11/2002   Robinett --

Signed and Sealed this

Ninth Day of November, 2010

David J. Kappos
*Director of the United States Patent and Trademark Office*